J. P. ARCHDEACON.
MOLD FOR MAKING FLUTED COLUMNS.
APPLICATION FILED NOV. 17, 1908.

925,858.

Patented June 22, 1909.
5 SHEETS—SHEET 1.

INVENTOR
John P. Archdeacon
BY
ATTORNEYS

J. P. ARCHDEACON.
MOLD FOR MAKING FLUTED COLUMNS.
APPLICATION FILED NOV. 17, 1908.

925,858.

Patented June 22, 1909.
5 SHEETS—SHEET 2.

WITNESSES

INVENTOR
John P. Archdeacon
BY Munn & Co.
ATTORNEYS

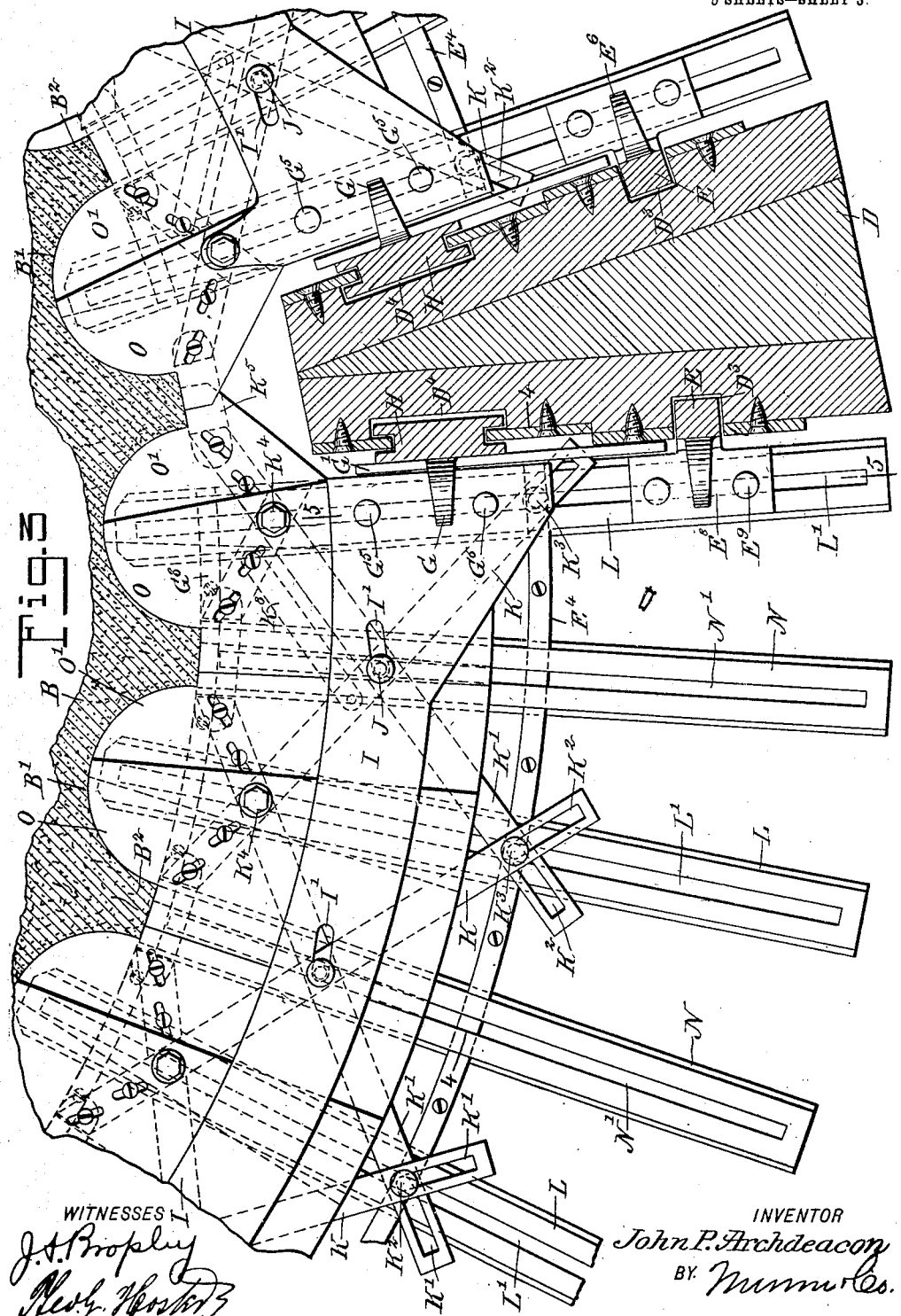

J. P. ARCHDEACON.
MOLD FOR MAKING FLUTED COLUMNS.
APPLICATION FILED NOV. 17, 1908.
925,858.
Patented June 22, 1909.
5 SHEETS—SHEET 4.
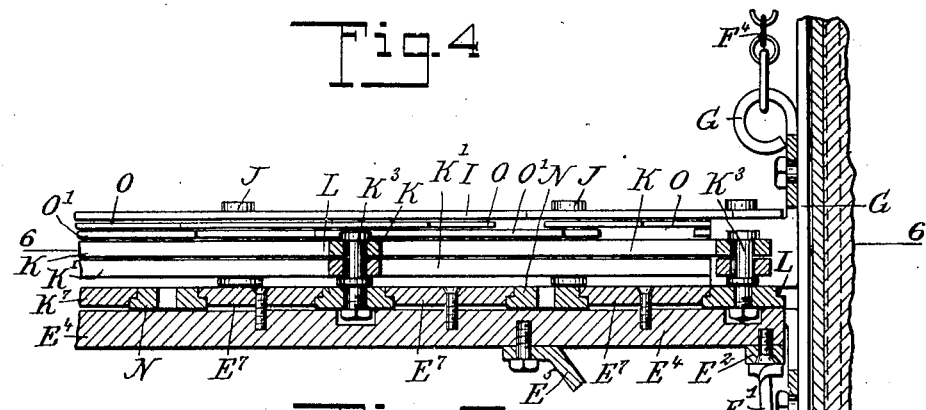
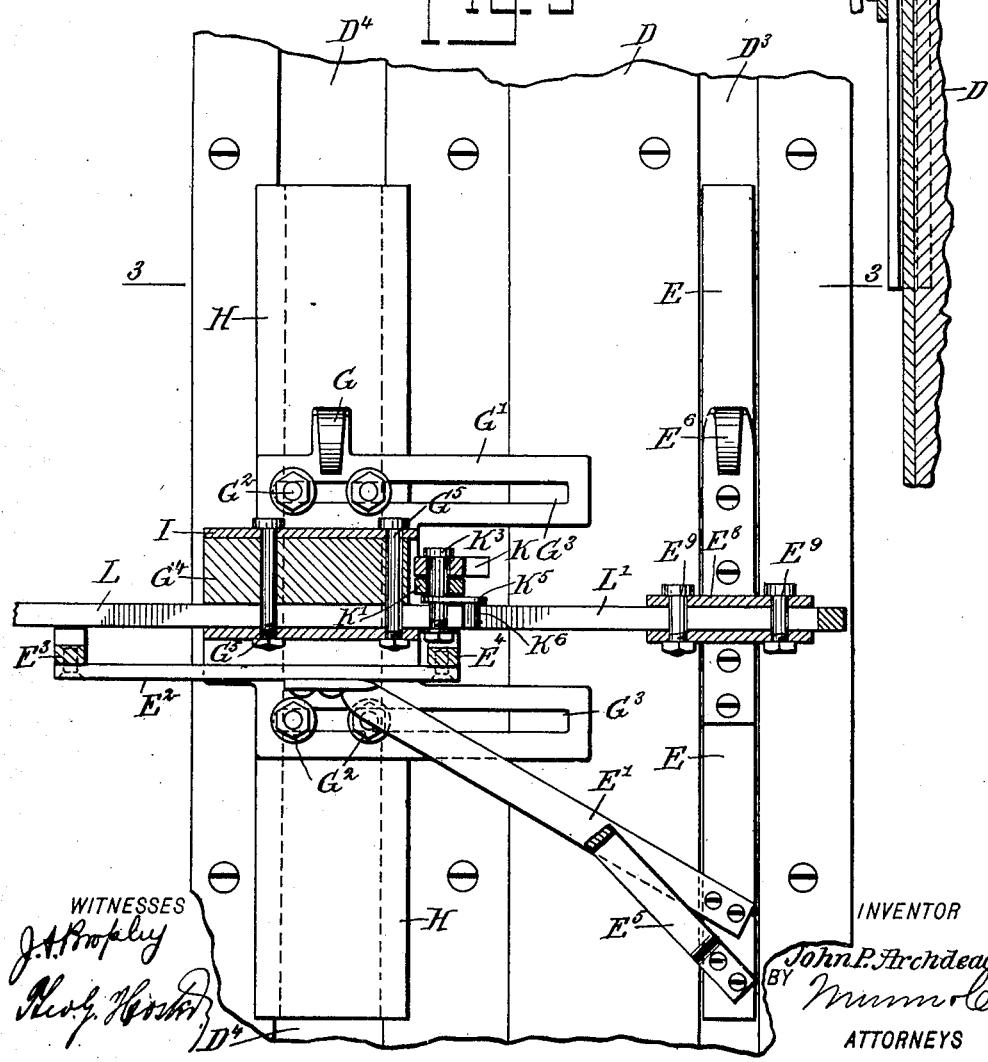
WITNESSES
INVENTOR
John P. Archdeacon
BY
ATTORNEYS

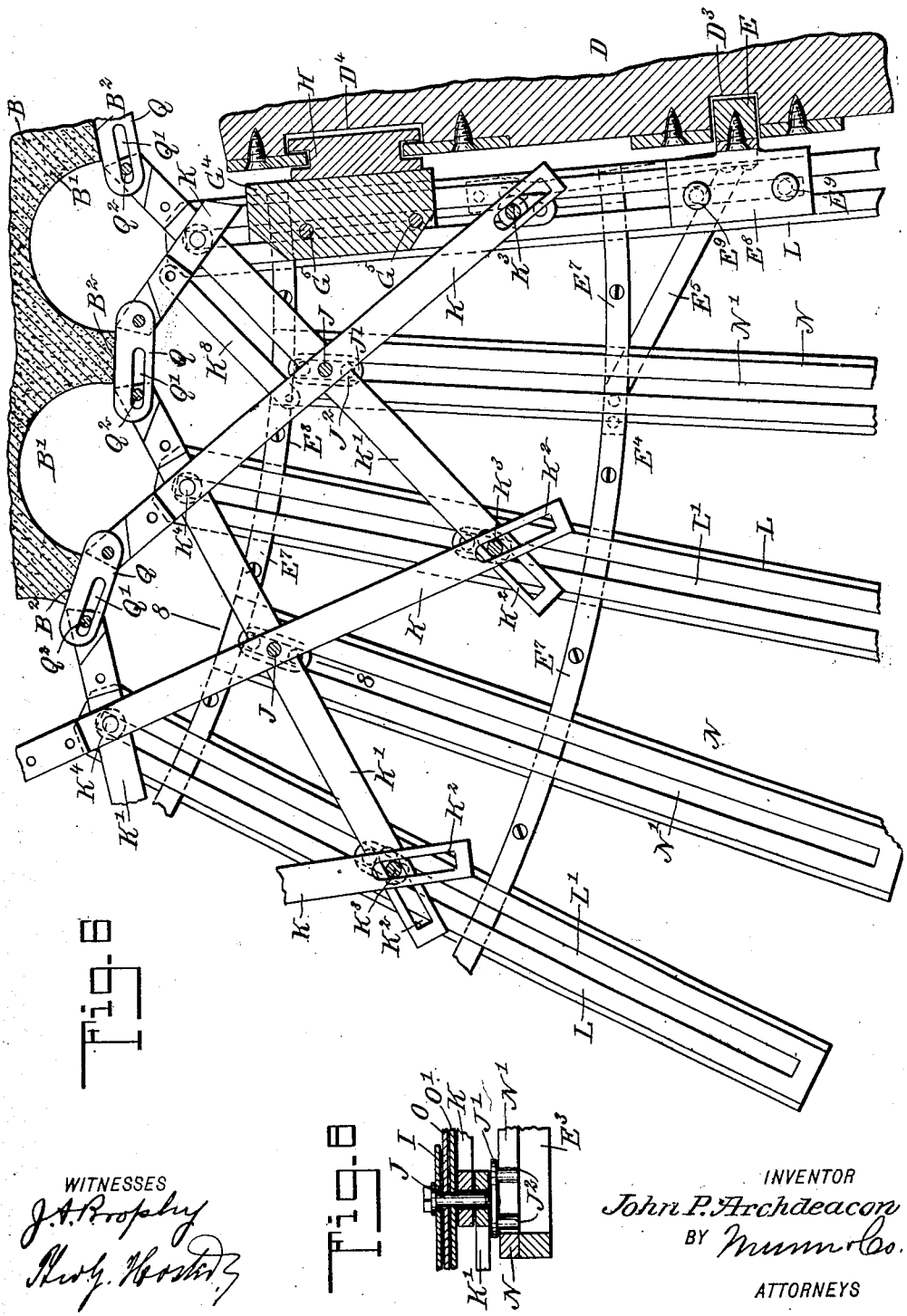

UNITED STATES PATENT OFFICE.

JOHN P. ARCHDEACON, OF BOSTON, MASSACHUSETTS.

MOLD FOR MAKING FLUTED COLUMNS.

No. 925,858.        Specification of Letters Patent.        Patented June 22, 1909.

Application filed November 17, 1908. Serial No. 463,010.

*To all whom it may concern:*

Be it known that I, JOHN P. ARCHDEACON, a citizen of the United States, and a resident of Boston, in the county of Suffolk and State of Massachusetts, have invented a new and Improved Mold for Making Fluted Columns, of which the following is a full, clear, and exact description.

The object of the invention is to provide a new and improved mold for making fluted columns of cement, plaster or other plastic material, the mold being arranged to permit of building the column at the intended place on a building or in a shop, and giving it the desired tapering form and producing the flutes on the exterior surface with gradually less depth and width according to the taper of the column.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1:
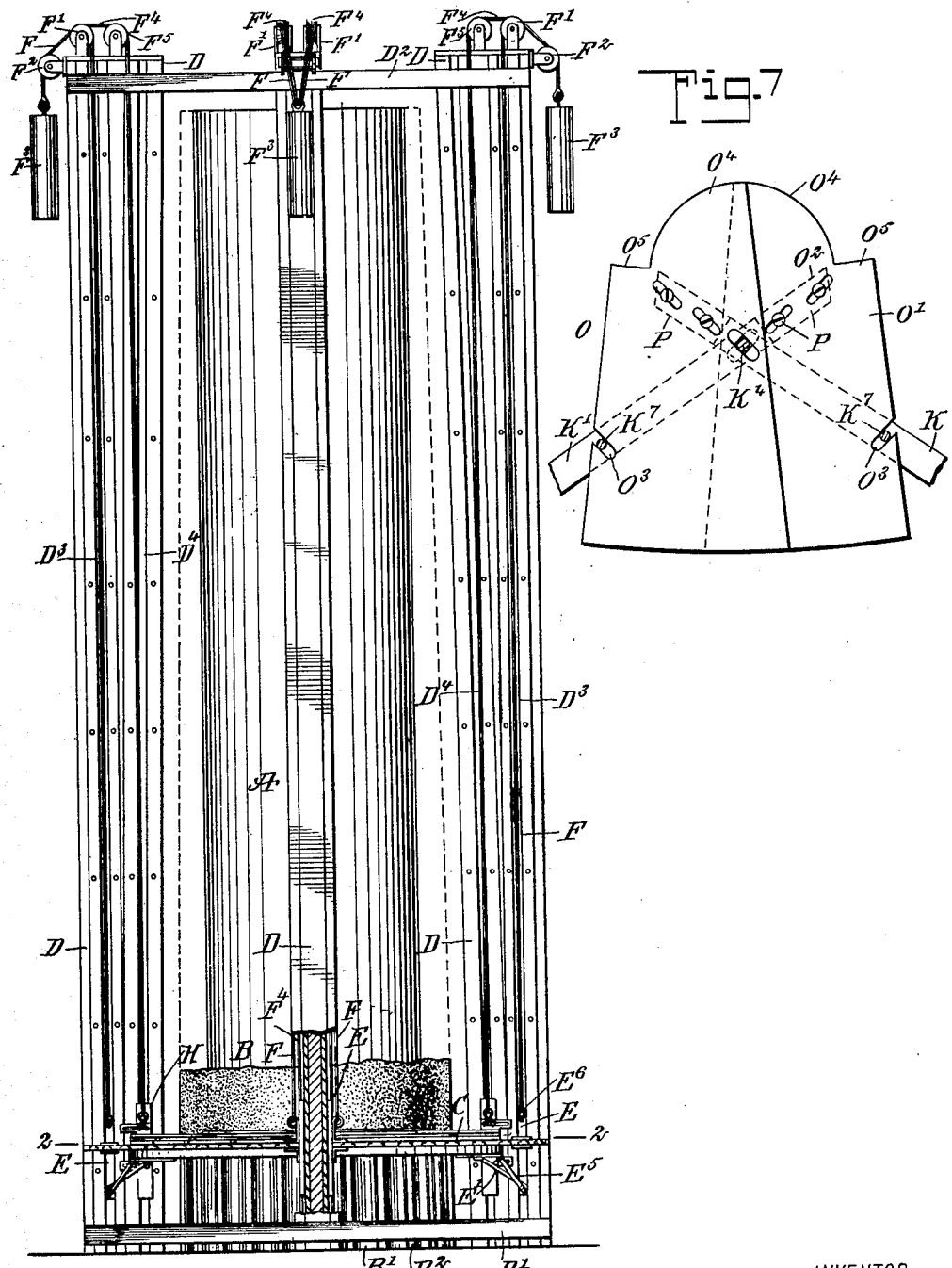
Figure 2:
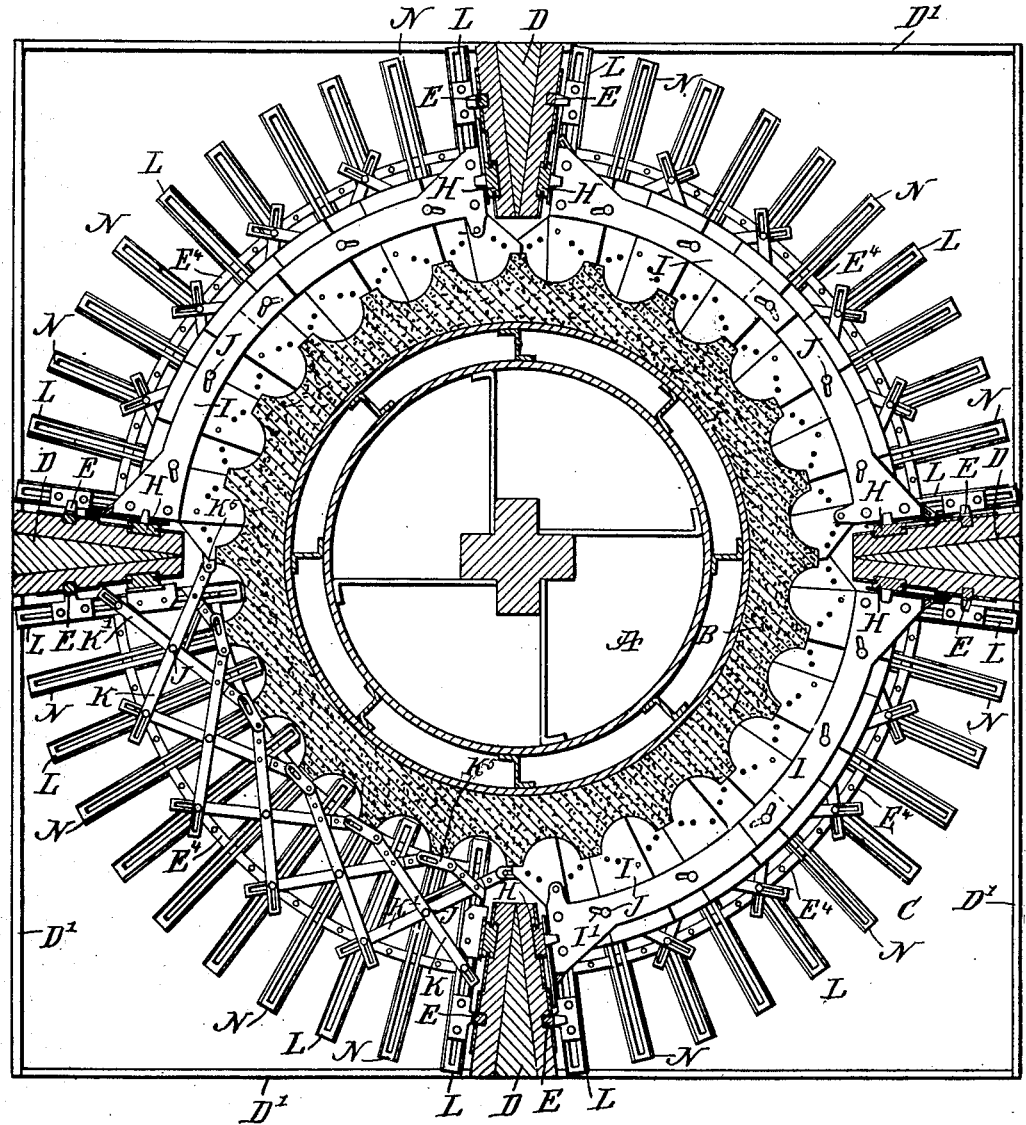

Figure 1 is a side elevation of the improvement as applied, parts being in section; Fig. 2 is an enlarged sectional plan view of the same on the line 2—2 of Fig. 1; Fig. 3 is an enlarged sectional plan view of the improvement on the line 3—3 of Fig. 5; Fig. 4 is a sectional side elevation of the same on the line 4—4 of Fig. 3; Fig. 5 is a cross section of the same on the line 5—5 of Fig. 3; Fig. 6 is an enlarged sectional plan view of the improvement on the line 6—6 of Fig. 4, and showing the "former" at a point removed from the base of the column; Fig. 7 is a plan view of one of the pairs of knives and the arms for opening and closing the knives; and Fig. 8 is a cross section of the improvement on the line 8—8 of Fig. 6.

The core A of the mold is preferably in the form of a hollow cylinder and may be set on the foundation of the column B, to be built up of cement, concrete, plaster or other suitable plastic material placed while in plastic state by the workmen upon the exterior face of the core from the foundation upward, as the forming of the column progresses; and in order to provide the exterior surface of this plastic material B with the usual alternating flutes B' and fillets or ridges B² and to gradually diminish or taper the column, use is made of a former C gradually moved upward as the building of the column advances.

The former C is mounted on uprights D, preferably four in number, grouped around the core A and spaced from the same, as plainly indicated in Fig. 2, the lower and upper ends of the uprights D being connected with each other by connecting bars D' and D² (see Figs. 1 and 2), to form a rigid although temporary structure. Each of the uprights D is provided at each of its sides with guideways D³, D⁴, of which the outer guideway D³ is disposed vertically while the inner guideway D⁴ is inclined inwardly, as plainly shown in Fig. 1. In the outer guideway D³ is mounted to slide up and down a slide E, provided with a bar E' extending inwardly and attached to a cross bar E² connecting the ends of segmental bars E³, E⁴ with each other, the outer segmental bar E⁴ being also connected by a bar E⁵ with the slide E. The slide E, the bars E', E⁵, the cross bar E² and the segmental bars E³, E⁴ between adjacent supports D, form a rigid section of a skeleton former frame, and in order to move the four sections in unison and gradually upward, as the building of the column progresses, the following arrangement is made: On the slide E is secured or formed a hook E⁶ engaged by one end of a cord or a chain F, extending upwardly and passing over pulleys F', F² mounted on the upper end of the corresponding upright D. A weight F³ is attached to the upper ends of the cords F of the two slides E for one upright D, and the said weight F³ is also connected with two cords F⁴ likewise passing over the pulleys F², F' and over the pulleys F⁵, mounted on the upper ends of the uprights D, to direct the cords F⁴ downward on opposite sides of the uprights D, and to allow their attachment to hooks G on brackets G' adjustably secured by bolts G² to slides H, mounted to slide up in the inclined guideways D⁴ of the corresponding upright D. Thus the weight F³ of each upright D counterbalances the slides E and H and the parts supported thereby, to allow convenient upward movement of the former C as the building of the column B progresses. Each of the brackets G' is provided with transversely extending slots G³ through which pass the bolts G² to allow of adjusting the brackets G' transversely on the slides H.

On each bracket G' is formed a shelf G⁴ on which is secured by bolts G⁵ a push plate I in the form of a segment of a circle and overlapping a similar push plate I attached to the shelf G⁴ of the bracket G' on the next following upright D, as will be readily understood by reference to Fig. 2. Each of the push plates I is provided with elongated slots I' through each of which extends a pivot J forming the fulcrum of the crossing members K and K' of a lazy tong, ranging in segmental shape from one upright D to the next following one, the members K and K' of the lazy tong being provided at their outer ends with elongated slots K² for the passage of a pivot K³, and the inner ends of the members K, K' are connected with each other by pivots K⁴, so that when the push plates I are moved inward the lazy tongs are closed, as hereinafter more fully explained. The pivots K³, K⁴ extend in the slots L' of radially disposed arms L, resting on and secured to the bars E³, E⁴ by clamps E⁷ attached to and forming part of the bars E³, E⁴ of the former frame previously mentioned.

Each pivot K³ is provided with a washer K⁵, extending between the bottom member K' and the corresponding arm L, and from the washer K⁵ depends a guide pin K⁶, also extending into the slot L' of the corresponding arm L, the same as the pivot K³ (see Fig. 5), the arrangement allowing easy sliding of the pivot K³ in the slot L' of the arm L. Each of the pivots J rises from a plate or washer J' extending between the member K' and a radially-disposed arm N, secured by the clamps E⁷ to the bars E³, E⁴ of a former frame section, and from each washer J' depend guide pins J², extending into a slot N' of the corresponding arm N. The slotted radial arm L adjacent to an upright D is also engaged by a guideway E⁸ attached to the slide E and having bolts E⁹ passing through the slot L'. The bolts G⁵ of the shelf G⁴ previously mentioned also pass through the slot L' of the arm L adjacent to the upright D, as will be readily understood by reference to Figs. 3 and 5.

The arms L and N alternate and are radially disposed relatively to the flutes B' and the fillets B² of the column B, and said flutes B' and the fillets B² are formed by sets or pairs of knives O, O' secured to the inner ends of the lazy tong members K, K'. The knives O, O' are adjustably secured to the lazy tong members K, K' by screws P screwing in the members K, K' and passing through elongated slots O² in the knives O, O', as plainly shown in Fig. 7. The lazy tong members K, K' are also provided with guide pins K⁷ extending into elongated slots O³ formed in the knives O, O', so as to properly guide the knives one over the other on closing the members K, K' of the lazy tongs. The knives O, O' of a pair of knives form a semi-circular cutting edge O⁴, for forming the flute B', and from the ends of the semi-circular cutting edge O⁴ extend sidewise the straight cutting edges O⁵ for forming the fillets B², it being understood that the knives O, O' of adjacent pairs overlap each other, so that the two straight cutting edges O⁵ of the over-lapping knives O and O' of adjacent pairs completely cover the fillet B², as will be readily understood by reference to Fig. 3.

On the inner end of each member K is pivoted a scraper Q underlying the knives and having an elongated slot Q' engaging a pin Q² on the inner end of the member K' of the next adjacent pair of members K, K' (see Fig. 6). The scrapers Q follow the knives and scrape the outer faces of the fillets B² true. By having a scraper Q connecting the links K, K' on opposite sides of a support D with each other, it is evident that the four lazy tongs, ranging between the several supports D, are connected with each other, as will be readily understood by reference to Figs. 2 and 6. The lazy tong members K adjacent to the supports D are shortened and connected by links K⁸ with the lazy tong member K next following, so that the connected lazy tongs open and close simultaneously with each other.

The operation is as follows: The mold is set up centrally at a place on the building on which the column is to be erected, or the mold is set up in a shop in case it is desired to make columns and ship the same to their destination. When the mold is set up the former C is at the bottom, and then the workmen place the plastic material B against the outside of the core A, to a desired thickness and a suitable working height, and then the former C is raised so that the sets of knives O, O' form the flutes B' and the fillets B² on the outer face of the plastic material, that is, the surplus material removed by the knives O, O' and resting on the top thereof is removed by the workmen as the former C rises. The column is gradually built up in the manner described, and as the former C rises, the slides H move inward bodily on account of traveling in the inclined guideways D⁴, and this inward movement of the slides H causes a like inward movement of the push plates I, so that the pivots J thereof act on the members K, K' of the lazy tongs to close the same gradually, thus causing the knives O, O' of each pair to gradually move over each other and thus reduce the cutting edges O⁴ thereof, both in shape and depth, as will be readily understood by comparison of Figs. 3 and 6, Fig. 3 showing the knives O and O' near the base of the column while Fig. 6 discloses the position of the former C at a distance above the base. By having the several sections of the former arranged in the manner described, it is evident that they move practically together, and the desired taper is given to the column, and at the same time the flutes B' and the fillets B² are properly formed with gradually less depth and width. By having the scrapers Q following the knife extensions Q⁵, it is evident that the fillets are scraped perfectly true, as will be readily understood by reference to Fig. 6. By having the knives O and O' adjustable on the lazy tong members K, K' and by adjusting the radial arms L and N on the bars E', E⁴ of the former frame, it is evident that the same former can be used for forming flutes B' and fillets B² of different depth and width for different sized columns. In practice, a former can be used for columns running from eighteen inches in diameter to say twenty inches in diameter, but with the addition of extra knives the former can be used for smaller or larger sized columns. After the column has been built, the sections of the mold can be readily taken apart, so that the column is left standing at its intended place on the building, and the mold can be set up in another place for forming another column in the manner described.

Having thus described my invention, I claim as new and desire to secure by Letters Patent:

1. A mold for making a column of plastic material, having a former surrounding the plastic material and having movement in the direction of the axis of the column, to shape the exterior surface of the column.

2. A mold for making a column of plastic material, comprising a core, and a former completely surrounding the core, spaced therefrom and having movement in the direction of the axis of the core to shape the exterior surface of the plastic material.

3. A mold for making a column of plastic material, comprising a vertically disposed core, and a former concentrically surrounding the core and spaced therefrom, and means for guiding the former in the direction of the axis of the said core.

4. A mold for making fluted columns of plastic material, comprising a vertical core, guideways, and a fluting former concentrically surrounding the core and mounted to slide on the said guideways.

5. A mold for making fluted tapering columns of plastic material, comprising a vertically-disposed core, vertical guideways grouped around the core, and a former mounted to slide on the said guideways and provided with means for forming the flutes and fillets of the column.

6. A mold for making fluted tapering columns of plastic material, comprising a former having knives completely encircling the plastic material and shaped to correspond to the exterior surface to be given to the column, and movable suspension means for the said former to suspend the latter and to move the former in the direction of the axis of the column.

7. A mold for making fluted tapering columns of plastic material, comprising a former having knives completely encircling the plastic material and shaped to correspond to the exterior surface to be given to the column, movable suspension means for the said former to suspend the latter and to move said former in the direction of the axis of the column, and a guideway on which the said former is mounted to slide.

8. A mold for making fluted tapering columns of plastic material, comprising a former having a frame and knives movable thereon, the knives completely surrounding the plastic material and shaped to correspond to the column to be made, and a guideway for the said former frame to slide in the direction of the axis of the column.

9. A mold for making fluted tapering columns of plastic material, comprising a former having a frame and knives movable thereon, the knives completely surrounding the plastic material and shaped to correspond to the column to be made, a guideway for the said former frame to slide in the direction of the axis of the column, and movable suspension means for suspending the said frame.

10. A mold for making fluted tapering columns of plastic material, comprising a former having a frame and knives movable thereon, the knives completely surrounding the plastic material and shaped to correspond to the column to be made, a guideway for the said former frame to slide in the direction of the axis of the column, and movable suspension means for suspending the said frame, and consisting of cords, counterbalancing weights and pulleys, of which the cords pass over the pulleys mounted on the guideway, the cords carrying at one end the weight and at the other end being connected with the said former frame.

11. A mold for making fluted tapering columns of plastic material, provided with a former having sets of annularly arranged knives, conforming at their cutting edges to the flutes to be formed on the exterior surface of the column.

12. A mold for making fluted tapering columns of plastic material, provided with a former having sets of annularly arranged knives, conforming at their cutting edges to the flutes to be formed on the exterior surface of the column, the knives in each set being movable one relatively to the other, to form a graduated cutting edge according to the diminution of the flutes.

13. A mold for making fluted tapering columns of plastic material, provided with a former having sets of annularly arranged knives, conforming at their cutting edges to the flutes to be formed on the exterior surface of the column, the knives in each set being movable one relatively to the other, to form a graduated cutting edge according to the diminution of the flutes, means for moving the said knives into graduated positions, and means for moving the knives bodily in the direction of the axis of the columns.

14. A mold for making fluted tapering columns of plastic material, comprising a frame, slotted arms mounted to slide radially on the said frame, a push plate mounted to move bodily upward and inward, lazy tongs engaging the said radial arms and the said push plate to close the lazy tongs on the upward and inward movement of the said push plate, and knives mounted on the said lazy tongs.

15. A mold for making fluted tapering columns, comprising a frame mounted to slide bodily upward, slotted arms mounted radially on the said frame, a push plate mounted to move bodily upward and inward and connected with alternate radial arms, lazy tongs fulcrumed on the said push plate and having guiding connection with the other radial arms, and knives mounted on the free ends of the lazy tong members.

16. A mold for making fluted tapering columns, comprising a frame mounted to slide bodily upward, slotted arms mounted radially on the said frame, a push plate mounted to move bodily upward and inward, and pivots adjustably connecting the push plate with alternate radial arms, lazy tongs fulcrumed on the said pivots and having connection with the intermediate radial arms, and knives mounted on the free inner ends of the members of the lazy tongs.

17. A mold for making fluted tapering columns, comprising a frame mounted to slide bodily upward, slotted arms mounted radially on the same frame, a push plate mounted to move bodily upward and inward, pivots adjustably connecting the push plate with alternate radial arms, lazy tongs fulcrumed on the said pivots and having connection with the intermediate radial arms, knives mounted on the free inner ends of the members of the lazy tongs, and uprights having a vertical guideway for the said frame to slide in and an inclined guideway for the said push plate to slide in.

18. A mold for making fluted tapering columns, comprising a frame mounted to slide bodily upward, slotted arms mounted radially on the said frame, a push plate mounted to move bodily upward and inward, pivots adjustably connecting the push plate with alternate radial arms, lazy tongs fulcrumed on the said pivots and being connected with the intermediate radial arms, knives mounted on the free inner ends of the members of the lazy tongs, uprights having a vertical guideway for the said frame to slide in, and an inclined guideway for the said push plate to slide in, and counterbalancing means for the said frame and the said push plate.

19. A mold for making fluted tapering columns of plastic material, comprising a series of uprights and having inclined and vertical guideways, a sectional frame having each section provided with slides engaging the said vertical guideways, slotted arms extending radially and adjustably secured on the said frame, push plates having slides engaging the inclined guideways in the said uprights, lazy tongs engaged by the said push plate to open or close the same, and knives carried by the said lazy tongs.

20. A mold for making fluted tapering columns of plastic material, comprising lazy tongs, means for closing the same, and knives made in sections and attached to the free ends of the members of the lazy tongs, to graduate the cutting edges of the knives on operating the lazy tongs.

21. A mold for making fluted tapering columns of plastic material, provided with a lazy tong arranged in the form of a segment of a circle, means for actuating the lazy tong, and knives, each made in two overlapping parts and having a semicircular cutting edge, the knife parts being attached to the free ends of the members of the said lazy tong.

22. A mold for making fluted tapering columns of plastic material, provided with a lazy tong, sectional knives mounted on the free ends of the members of the said lazy tong and having semicircular cutting edges for forming the flutes of the column, scrapers for scraping the fillets of the column, and means for actuating the said lazy tong and the said scrapers.

23. A mold for making fluted tapering columns of plastic material, having knives for forming the grooves and fillets and scrapers underlying the knives for scraping the fillets.

24. A mold for making fluted tapering columns of plastic material, having knives for forming the grooves and fillets and scrapers underlying the knives for scraping the fillets, the knives having semicircular cutting edges and the scrapers having straight cutting edges.

25. A mold for making fluted tapering columns of plastic material, having alternating knives and scrapers, the knives having semicircular cutting edges and being made in sections overlapping one the other.

26. A mold for making fluted tapering columns of plastic material, having alternating knives and scrapers, the knives having semicircular cutting edges, and being made in sections overlapping one the other, and means for moving the knife sections to vary the size of the cutting edge.

27. A mold for making fluted tapering columns of plastic material, provided with a knife having a semicircular cutting edge and made in overlapping sections, and means for moving the said knife sections to vary the cutting edge of the knife.

28. A mold for making fluted tapering columns of plastic material, provided with a knife having a semicircular cutting edge and made in overlapping sections, each of which is provided with an extension formed with a straight cutting edge, and means for moving the said knife sections to vary the cutting edge of the knife.

29. A mold for making fluted tapering columns of plastic material, provided with sets of knives having semicircular cutting edges and made in sections movable one over the other, the adjacent sections of successive sets of knives having overlapping cutting extensions.

30. A mold for making fluted tapering columns of plastic material, provided with sets of knives having semicircular cutting edges and made in sections movable one over the other, the adjacent sections of successive sets of knives having overlapping cutting extensions formed with a straight cutting edge.

In testimony whereof I have signed my name to this specification in the presence of two subscribing witnesses.

JOHN P. ARCHDEACON.

Witnesses:
DENNIS J. SULLIVAN,
DANIEL E. IRWIN.